United States Patent [19]

Costa

[11] 4,373,708
[45] Feb. 15, 1983

[54] THRUST ABSORPTION MECHANISM

[75] Inventor: Jorge Costa, Yverdon, Switzerland

[73] Assignee: Hermes Precisa International S.A., Yverdon, Switzerland

[21] Appl. No.: 165,485

[22] PCT Filed: Feb. 6, 1979

[86] PCT No.: PCT/CH79/00019
§ 371 Date: Oct. 7, 1979
§ 102(e) Date: Aug. 28, 1979

[87] PCT Pub. No.: WO79/00601
PCT Pub. Date: Aug. 23, 1979

[30] Foreign Application Priority Data

Feb. 7, 1978 [CH] Switzerland ............ 1327/78

[51] Int. Cl.$^3$ .................. B41J 19/08; B41J 21/06
[52] U.S. Cl. ............................ 267/136; 400/291; 400/341; 400/686
[58] Field of Search ............... 400/291, 341, 686, 687, 400/338.2; 267/136, 137

[56] References Cited

U.S. PATENT DOCUMENTS

| 1,050,548 | 1/1913 | Kavle | 400/291 |
|---|---|---|---|
| 1,516,685 | 11/1924 | Rinsche | 400/686 X |
| 1,992,940 | 3/1935 | Foothorap | 400/686 X |
| 2,818,959 | 1/1958 | Walton | 400/341 X |
| 2,826,287 | 3/1958 | Dodge | 400/341 |
| 2,862,593 | 12/1958 | Buhler et al. | 400/291 X |
| 2,879,879 | 3/1959 | Dodge | 400/341 |
| 3,048,255 | 8/1962 | Israelson | 400/341 |

Primary Examiner—Edgar S. Burr
Assistant Examiner—Charles Pearson
Attorney, Agent, or Firm—Emory L. Groff, Jr.

[57] ABSTRACT

A shock absorption thrust mechanism includes a thrust piece (19) which is used as a stop for a moving body in motion. This thrust piece 19 is prone to displacement under the effect of kinetic energy of the moving body, against the action of a spring (20) and a shock absorber (21). The displacement of the thrust piece (19) depends on the kinetic energy of the moving body under shock, which is prejudicial particularly with respect to typewriters, where this displacement occurs in the stop position of the moving body or ensures the control of a function. In order to obtain a constant displacement of the thrust piece (19), the mechanism includes a driving device (10, 24) which moves the thrust piece (19) in a predetermined movement, the driving device (10, 24) acting jointly with the moving body on the thrust piece (19).

3 Claims, 2 Drawing Figures

THRUST ABSORPTION MECHANISM

This invention pertains to a thrust absorption mechanism, which includes a thrust piece the function of which is to block a moving body in motion, and in which the thrust piece is subject to displacement under the effect of kinetic energy of said moving body against the action of a spring and a shock absorber.

This form of mechanism allows the reduction of stress due to shocks in the moving body when the latter works together with the thrust piece, thus it allows a reduction of the size of the components and also a reduction in cost.

In numerous applications, such as in typewriters, a thrust mechanism is used to establish the position of a moving body at full stop, it being locked after the stop stroke when its speed is nil or slight, as the spring is compressed. In such cases, use is generally made of an intermediate member between the moving body and the thrust piece, this intermediate member being released when the moving body is locked.

However, in such known mechanisms, the stop stroke depends on kinetic energy and as a result there is uncertainty as to the stop position of the moving body in relation to the thrust mechanism. This can be very troublesome in the case of certain applications and expecially in a situation where there is used a thrust mechanism of the kind to stop the slide which carries the letter support of a typewriter during a tabulation, for example.

The object of the invention is to achieve a shock absorption thrust mechanism for typewriters which guarantees a continuing stop stroke of a moving body to be stopped regardless of its initial speed.

The thrust mechanism according to the present invention is characterized by the fact that it includes a drive device for the thrust piece in a predetermined movement, said drive device acting jointly with the moving body on said thrust piece.

The attached drawing shows, schematically and by way of example, a preferred embodiment of the thrust absorption mechanism, which is the object of the invention.

Figure 2:
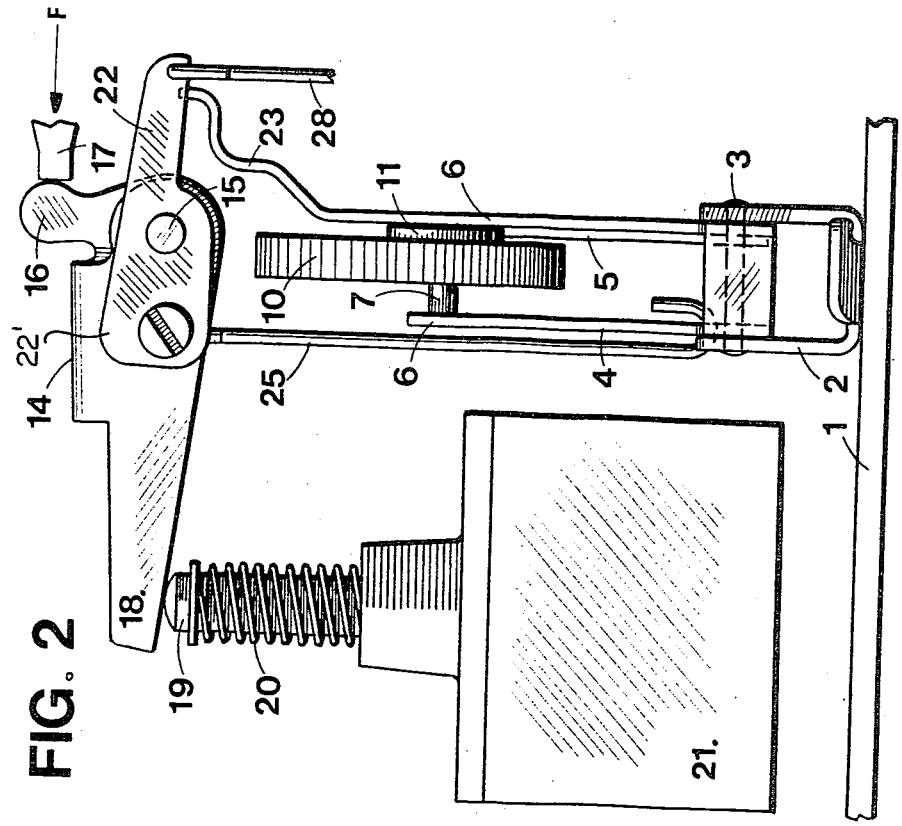
FIG. 2 is a view from above.
Figure 1:
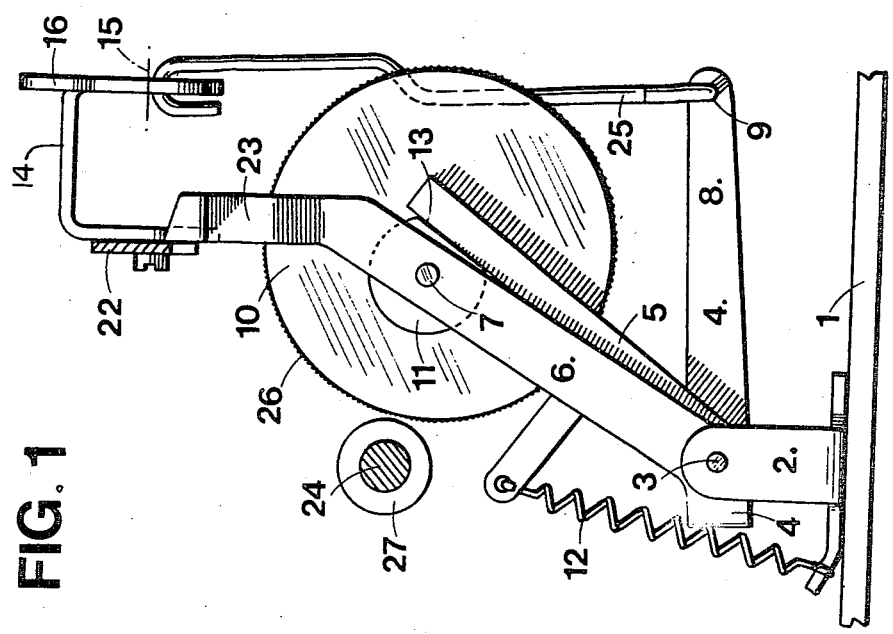
FIG. 1 is a side view of the thrust absorption mechanism of the invention.

The thrust mechanism depicted in the drawing is attached to a stand 1 by a bracket 2 provided with a pin 3. A lever 4 and an arm 5 are hinged around the pin 3. The lever 4 comprises a punched and folded sheet so as to form, on the one hand, a double arm 6 carrying an axle 7 and, on the other hand, a lever arm 8 which has a hole 9 at its tip. A cam in the form of an eccentric roller 10 is mounted on axle 7 and has a circular shoulder 11 centered with respect to axle 7. The arm 5 is pressed against shoulder 11 by a draw spring 12 and can work together with a flat truncated surface 13 of the shoulder 11 so as to maintain the eccentric roller 10 in a rest position shown in FIG. 1.

A bell crank 14, rotating around an axle 15 attached to the stand 1, includes a thrust receiving abutment 16 engaged by a member 17 attached to a moving body, not shown on the drawing. The bell crank 14 includes a tip 18 which works together with a thrust piece 19 through its tip 18. The thrust piece 19 slides against the action of a spring 20 and a shock absorber 21. A tip 22 of a lever 22' connected to the bell crank 14 works together with one of the sides 23 of the double arm 6 to maintain the eccentric roller 10 away from a driving shaft 24 driven in continuing rotation by an electric motor, not shown.

A rod 25, engaged in the hole 9 of the lever arm 8, links the latter to the bell crank 14 so that a rotation of the lever arm 8 transmits a corresponding rotation to the bell crank 14.

Preferrably, the eccentric roller 10 is made of plastic and has a notched tread 26. The driving shaft 24 is surrounded by a rubber sleeve 27 in its portion which engages the tread 26 of the eccentric roller 10.

when the member 17, attached to the moving body to be stopped, comes toward the abutment 16 in the direction of arrow F, the bell crank 14 rotates and tilts downwardly with its tip 18 acting on the thrust piece 19 to depress it against the action of spring 20.

The side 23 of the double arm 6 pulls away from the tip 22, and the eccentric roller 10, under the action of the spring 12 which is acting through the arm 5, moves into position to engage the driving shaft 24. As a result of its eccentricity, the roller 10, driven in rotation by the driving shaft 24, forces the lever 4 to rotate. The lever 4, by means of the lever arm 8 and the rod 25, causes rotation of the bell crank 14 in the same direction as that initiated by the moving body to be stopped. Driven by the bell crank 14, the thrust piece 19 slides against the action of spring 20 and shock absorber 21.

When the roller 10 has rotated a half of a turn, a rod 28 affixed to the tip 22 of lever 22' controls the locking of the moving body which is stopped, as well as the uncoupling of member 17 from the moving body.

The roller 10 which continues to turn causes a reverse rotation of the lever 4 until the side 23 of the double arm 6 engages the tip 22. The arm 5 then works together with the truncated surface 13 of the shoulder 11, so as to maintain the roller 10 in rest position.

The mechanism described above, guarantees a continuing stop stroke for the moving body to be stopped, regardless of its initial speed. Indeed, if the speed of the moving body is high, the forces of inertia are the major ones involved in acting on the thrust piece 19. To the contrary, if the speed of the moving body is low, the thrust piece 19 is mostly subject to the forces transmitted by the drive device, while the member 17 attached to the moving body follows the displacement of the thrust 16 which works together with the thrust piece 19.

One can anticipate many variations of the mechanism which is the object of the invention. For instance, the driving device could act directly on the thrust piece 19. The roller 10 could have a cam section which gives the moving body a gradually decreasing deceleration according to a predetermined function.

I claim:

1. In a thrust absorption mechanism comprising a thrust piece (19) providing a stop for a moving body, said thrust piece (19) being displaced under the effect of the kinetic energy of said moving body against the action of a compression spring (20) and a shock absorber (21), a driving device (10,24) and retaining means (22,23) preventing the driving device from being engaged, the improvement wherein said retaining means (22,23) is released upon movement of said thrust piece (19), said mechanism comprises apparatus (5,12) for causing said device (10,24) to be engaged upon release of said retaining means (22,23), said driving device acting jointly with said moving body on said thrust piece (19) and driving said thrust piece in a controlled and predetermined movement, a bracket (2), a pin (3) fixedly mounted on said bracket, a first lever (4) rotatably mounted on said pin, said lever including a first arm (6) and a second arm (8), means connecting said second arm (8) to said thrust piece (19), said driving device comprising a cam (10) and a driving shaft (24), means for driving said shaft in continuous rotation, said cam (10) engaging said driving shaft (24) upon actuation of said apparatus (5,12), said cam comprising an eccentric roller (10) including a circular shoulder (11), said apparatus comprising a second lever (5) and a draw spring (12), said second lever rotatably mounted at one of its ends on said fixed pin (3), the other end of said second lever (5) engaging said circular shoulder (11) of said eccentric roller (10), said draw spring (12) acting on said eccentric roller through said second lever (5) and biasing said eccentric roller (10) toward said driving shaft (24).

2. A mechanism according to claim 1 wherein, said circular shoulder (11) has a flat truncated surface (13) on a portion of its circumference, said surface cooperating with said second lever (5) so as to maintain said eccentric roller (10) in a rest position.

3. A mechanism according to claim 2 including, a rotatably mounted bell crank (14), said bell crank including a thrust receiving abutment surface (16) engaged by a member (17) attached to said moving body when a shock is imparted to said mechanism by said moving body, said retaining means comprising a first tip (22) of said bell crank (14) engaged by the extremity (23) of said first arm (6), a second tip (18) of said bell crank engaging said thrust piece (19).

* * * * *